Nov. 19, 1968 R. C. SEAMANS, JR 3,411,356
DEPUTY ADMINISTRATOR OF THE NATIONAL AERONAUTICS AND SPACE ADMINISTRATION
ZETA POTENTIAL FLOWMETER
Filed Aug. 3, 1966
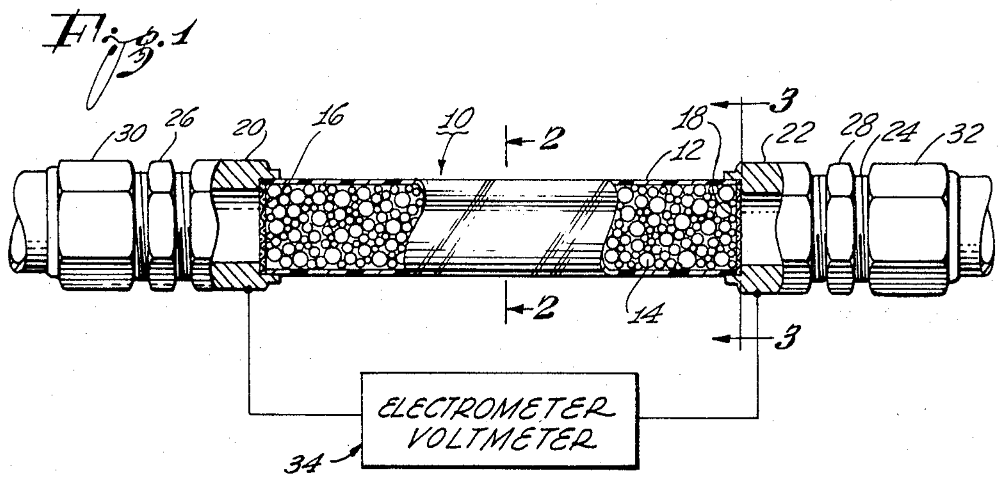
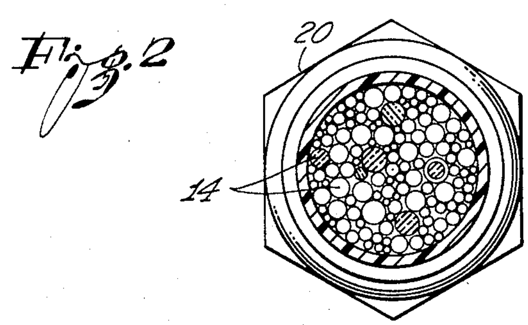
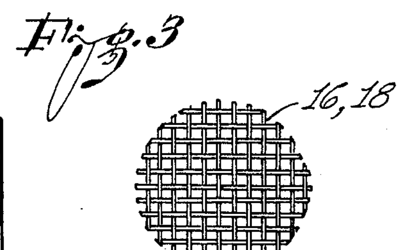
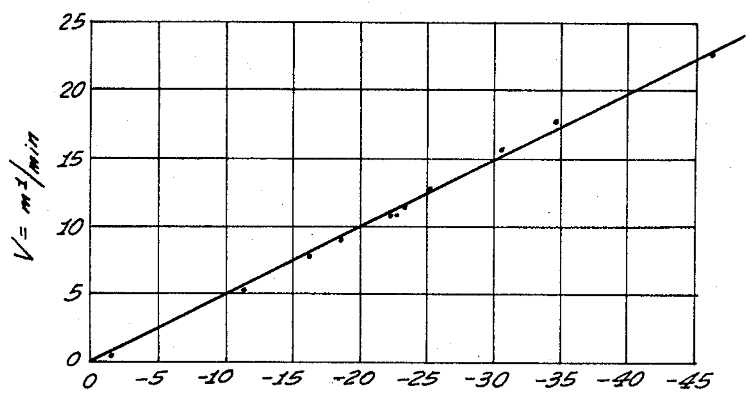
INVENTORS
BILLY G. MOSER
RAYMOND E. WIECH
By David E. Leslie, Gerry & Cox
ATTORNEYS

United States Patent Office 3,411,356
Patented Nov. 19, 1968

3,411,356

ZETA POTENTIAL FLOWMETER

Robert C. Seamans, Jr., Deputy Administrator of the National Aeronautics and Space Administration with respect to an invention of Billy G. Moser, Lake View Terrace, and Raymond E. Wiech, Anaheim, Calif.

Filed Aug. 3, 1966, Ser. No. 570,095
8 Claims. (Cl. 73—194)

ABSTRACT OF THE DISCLOSURE

A flowmeter is disclosed which consists of a tubular chamber, disposed in the direction of flow of a fluid. At least 60% of the chamber volume is filled with non-porous glass beads. Electrodes with electrically conductive meshes, through which fluid flows into and out of the chamber, are positioned at opposite ends of the chamber. The rate of flow of fluid through the chamber is determined by measuring the Zeta potential difference between the electrodes.

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to a flowmeter operating on an electrokinetic Zeta potential effect. More particularly, this invention relates to a highly sensitive flowmeter capable of measuring volumetric rates of flow which vary from very slow flow rates, of the order of 0.3 milliliter per month, for example, to vary high flow rates, such as 15–20 milliliters per minute, for example.

The lectrokinetic theory is well known to scientists and engineers dealing with the branch of science concerned with the physics and chemistry of surfaces. Four separate phenomena, generally designated as electrokinetic, are well known to scientists and engineers. These phenomena relate to electrical forces established by, or utilized for effecting the relative motion of solids and liquids which come into mutual contact.

The phenomena of "electro-osmosis," whereby a liquid is caused to move along the walls of a capillary tube by means if an applied electromotive force, was known as early as 1908. The phenomena of cataphoresis or electrophoresis, where solid particles moved through relatively stationary liquids by means of an electromotive force being applied to the solid particles, is also old and well known in the art. A third phenomena, known as stream or streaming potential, is observed when an electromotive force is created by a liquid being forced through capillary openings in relatively stationary solid matter. A fourth electrokinetic phenomena is produced when a potential gradient is created by dropping solid particles through liquids.

Of the four phenomena relating to electrokinetics the closest known phenomenon in similarity to the effects and results obtained by the flowmeter of this invention appears to be that of the "streaming potential" phenomenon. In explaining the streaming potential phenomenon, it has been stated that when a liquid comes into contact with the walls of a capillary opening, a double layer, perhaps of the order of molecular thickness, of electrical charges is produced in the liquid. Charges of one sign adhere to the walls of the capillary while, at a slight distance from the walls of the capillary, an equal number of charges of opposite signs are aligned within the liquid. This double layer of charges may be likened to a condenser. The potential between the "plates," i.e. the potential between the charges on the wall of the capillary and the charges within the liquid at a slight distance from the walls of the capillary, is designated as a Zeta potential.

From the study, background investigations, laboratory tests and experimentations performed to produce this flow meter strong indications exist that a phenomenon somewhat akin to, but different from, that of the streaming potential effect has been observed and utilized in perfecting this flowmeter. For example, instead of using porous material having capillary tubes through which liquid could flow thereby creating the typical streaming potential effect this flowmeter utilizes non-porous glass beads made from sulphur soda lime glass. Non-porous glass beads ranging in size from 25 microns, minimum, to 100 microns, maximum, are placed in a cylindrical cell so that 64% of the volume of the cell is occupied by beads. When liquid flows past the beads through the cell a diffused double layer of liquid surrounds each bead. As the liquid flows through the cell and around the beads a Zeta potential effect similar to that found with the streaming potential effect is created.

There has long existed a need for a flowmeter which has the capability of measuring extremely low flow rates yet has the capability of responding to and measuring extremely high flow rates. Thus an ideal flow meter would have a capability of measuring low flow rates without the loss of sensitivity and response to high flow rates. Requirements for such a flow meter exist not only in industry but also with scientists who are concerned with space and underwater exploration in that the space and weight requirements for instrumentation in these efforts dictate that the instruments so used be small, compact and light weight.

Accordingly, an important object of this invention is to provide a sensitive and accurate liquid flowmeter which is capable of measuring extremely low flow rates yet has the capability of measuring high flow rates and which maintains accuracy and sensitivity to variations in rates of flow throughout a wide range of flow rates.

Another object of this invention is to provide a flowmeter which has the capability of measuring the flow rates of liquids having low conductivity, such as in liquid fuels for rockets, for example.

Another object of this invention is to provide a flowmeter which may be utilized in a wide range of types and sizes of flow lines, and which may be effectively utilized in sub-miniaturized systems.

Another object of this invention is to provide a flowmeter having high sensitivity, accuracy and durability.

A further object of this invention is to provide a flowmeter which is simply and easily constructed, and is easily maintained, repaired and replaced.

Other objects and advantages of this invention will be apparent from the accompanying drawings and description and the essential features thereof are set forth in the appended claims.

In order that this apparatus may be understood in detail, reference is made to the accompanying drawings which form a part of this specification wherein:

FIGURE 1 is a side view, with sections cut away, of the flowmeter of this invention;

FIGURE 2 is a section of the flowmeter taken on line 2—2 of FIGURE 1;

FIGURE 3 is a section of the flowmeter showing one electrode in cross section taken along line 3—3 of FIGURE 1; and FIGURE 4 is a graphic plot of electromotive force in millivolts and volumetric rate of flow in milliliters per minute showing the linear relationship between flow rates and flowmeter output.

Referring to the drawings, and to FIGURE 1 thereof in particular numeral 10 generally designates the flowmeter of this invention. The flowmeter includes a tubular cell 12 which is filled with glass beads 14 which occupy approximately sixty-four percent (64%) of the internal volume of the cell 12. Although the tubular cell 12 may have varying dimensions for use in large systems and in sub-miniaturized systems, and may be made of different materials, a particular embodiment of the invention, illustrated and described herein, includes a tubular cell 12 which is approximately one-quarter of an inch in diameter and is made of Teflon material.

Electrodes 16 and 18 are placed on the left and right ends respectively of the tubular cell 12 as viewed in FIGURE 1. The electrodes are made preferably from a platinum mesh. However, it is considered that materials other than platinum could be utilized satisfactorily in this flowmeter. The platinum electrodes, as can be seen in FIGURE 3, have sufficiently large openings therein to permit a steady flow of fluid therethrough.

The electrodes 16 and 18 are retained in place on the ends of tubular cell 12 by retaining members 20 and 22. Each retaining member 20 and 22 is provided on one end with internal threads for screw thread attachment to a fluid conducting pipe 24. On the other end each retaining member is provided with a first internal diameter equal to the outside diameter of the electrodes 16 and 18 and the tubular cell 12 and a second internal diameter which is less than the outside diameter of the electrodes and tubular cell. The retaining members are press fitted to the electrodes and to the tubular cell so as to exert both an axial and a radial retaining force against the electrodes for securely holding the electrodes in place on the ends of the tubular cell 12.

Locking nuts 26 and 28 may be provided for the threaded portions of fluid pipe 24 for securely locking retaining members 20 and 22 against the electrodes 16 and 18 respectively. Hexagonal nuts 30 and 32 may be provided on fluid pipe 24 for facilitating the screw thread attachment of pipe 24 to retaining members 20 and 22 and for providing further locking force against nuts 26 and 28 and against retaining members 20 and 22.

An extremely high input resistance electrometer voltmeter 34 is utilized for measuring the potential between electrodes 16 and 18. As shown in FIGURE 1 the potential between electrodes 16 and 18 may be measured by electrically connecting the voltmeter 34 to the retaining members 20 and 22 and the electrodes 16 and 18.

Recent developments in electrometer circuits have produced an extremely high input resistance electrometer voltmeter. Thus, the potential gradient created in this flowmeter can now be measured with better accuracy than heretofore has been possible.

The beads 14 within the cell 12 are sulphur soda lime glass beads. The beads are non-porous and range from a minimum size of 25 microns to a maximum size of 100 microns. These glass beads occupy 64% of the volume within the cell 12.

FIGURE 4 shows the potential created by the passage of distilled water through the cell 12 filled with glass beads. As can be seen by reference to FIGURE 4 a linear relationship exists between the fluid flow rate and the cell output in millivolts as measured by the electrometer voltmeter 34. Measurements were made with this flowmeter for determining rates of flow of mineral oil having low conductivity and also for determining rates of flow of propylene oxide. It was determined from the flow rate measurements made for both these fluids that a similar linear relationship existed between the flow rate and the cell output in millivolts as measured by the voltmeter attached to the electrodes on the ends of the cell.

Since the glass beads used were non-porous it is obvious that the streaming potential effect created by the passage of liquid through capillary tubes is not involved in this flowmeter. Due to the diffused double layer of fluid surrounding each of the glass beads within the cell a potential is generated which has a linear relationship to the total flow rate passing over the beads and through the cell. Thus, this flowmeter is capable of giving an accurate indication of fluid flow through the flowmeter by means of the electrical output measured by the voltmeter 34.

This flowmeter has continued to give accurate readings over long periods of test time. The flowmeter has proven to be rugged and durable and has no moving parts which are subject to malfunctions. Therefore, the reliability of this flowmeter is thus greatly enhanced. Further it has been found that the dimensions of this flowmeter may be so proportioned as to facilitate its use in large systems and in sub-miniaturized systems.

While a particular embodiment of the invention has been illustrated and described, it is apparent that modifications may be made without departing from the scope of the invention. The following claims are intended to cover all such modifications which come within the spirit and scope of the invention.

What is claimed is:

1. A flowmeter for measuring volumetric rates of flow of fluid comprising:

a housing defining a chamber and positioned in the direction of flow of a fluid whose volumetric rate of flow is to be measured;

a plurality of discrete non-porous uncoated particles disposed in and filling at least a predetermined portion of said chamber;

first and second electrodes mounted in said housing and disposed within said chamber of mutually spaced relationship, the potential difference therebetween being a function of the rate of flow of said fluid; and means electrically connected to said first and second electrodes for measuring the potential difference therebetween.

2. The flowmeter defined in claim 1 in which said discrete particles disposed in said chamber fill at least 60% of the volume of said chamber.

3. The flowmeter defined in claim 2 in which said particles are glass beads varying in size from a minimum size of 25 microns to a maximum size of 100 microns.

4. The flowmeter defined in claim 1 in which said housing is in the form of a tubular cell, with one end defining a fluid inlet and an opposite end defining a fluid outlet, and wherein each of said first and second electrodes includes an electrically conductive mesh disposed at one of the cell's ends to permit fluid to pass therethrough.

5. The flowmeter defined in claim 4 in which said particles are non-porous glass beads of sizes in the range of about 25 to 100 microns.

6. A flowmeter for metering the volumetric rate of flow of a fluid comprising:

a tubular housing defining an inner chamber with a longitudinal axis positioned in the direction of flow of a fluild, said housing having first and second ends;

means connecting said housing so that the fluid flows into said housing through said first end and exits through said second end;

discrete non-porous particles disposed in said chamber and filling at least a predetermined portion of the chamber volume, first and second electrodes positioned at said first and second housing ends respectively, each electrode including an electrically conductive mesh disposed in the direction of flow of said fluild; and measuring means coupled to said first and second electrodes for measuring the electrical potential therebetween which is a function of the rate of flow of said fluid.

7. The flowmeter as recited in claim 6 wherein said non-porous particles are non-porous uncoated glass particles.

8. The flowmeter as recited in claim 7 wherein said glass particles are soda lime glass particles, of sizes in the range of about 25 to 100 microns.

References Cited

UNITED STATES PATENTS

| | | | |
|---|---|---|---|
| 2,615,940 | 10/1952 | Williams | 73—516 |
| 2,644,901 | 7/1953 | Hardway | 73—516 |
| 2,794,171 | 5/1957 | Terry | 73—194 |
| 3,315,518 | 4/1967 | Charlson et al. | 73—29 |

RICHARD C. QUEISSER, *Primary Examiner.*

C. A. REUHL, *Assistant Examiner.*